United States Patent [19]

Fejérdy et al.

[11] Patent Number: 5,024,424
[45] Date of Patent: Jun. 18, 1991

[54] AIR-SPRING, IN PARTICULAR FOR THE USE UNDER EXTREME CONDITIONS

[75] Inventors: István Fejérdy; Ottó Farkas; Gábor Havasi, all of Budapest, Hungary

[73] Assignee: TAURUS Gumiipari Vállalat, Budapest, Hungary

[21] Appl. No.: 234,885

[22] Filed: Aug. 22, 1988

[30] Foreign Application Priority Data

Sep. 2, 1987 [HU] Hungary .................. 3930/87

[51] Int. Cl.$^5$ .................. F16F 9/04
[52] U.S. Cl. .................. 267/64.27
[58] Field of Search .................. 267/64.19, 64.21, 64.23, 267/64.27, 122; 403/225, 227

[56] References Cited

U.S. PATENT DOCUMENTS

| 2,916,284 | 12/1959 | Bertsch et al. | 267/64.21 |
| 3,074,709 | 1/1963 | Ballard et al. | 267/64.21 |
| 3,130,965 | 4/1964 | Niclas | 267/64.27 |
| 4,506,910 | 3/1985 | Bierens | 267/64.27 X |
| 4,629,169 | 12/1986 | Arnaud et al. | 267/64.19 |
| 4,787,606 | 11/1988 | Geno et al. | 267/64.27 |
| 4,787,608 | 11/1988 | Elliot | 267/64.19 X |

FOREIGN PATENT DOCUMENTS

| 0210818 | 10/1956 | Australia | 267/64.27 |
| 3246599 | 6/1984 | Fed. Rep. of Germany . | |
| 3246962 | 6/1984 | Fed. Rep. of Germany . | |
| 1141285 | 8/1967 | France | 267/64.27 |
| 0808597 | 2/1959 | United Kingdom | 267/64.27 |

Primary Examiner—Robert J. Oberleitner
Attorney, Agent, or Firm—Schweitzer Cornman & Gross

[57] ABSTRACT

An improved air spring with a diaphragm fixed to a closing element by overlapping fitting, wherein the diaphragm is made of rubber or any other synthetic material similar to rubber, it is provided with a strength carrier insert and it has on one or both ends flanges reinforced with steel wire or any other suitable wire. The closing element is a cylindrical-symmetrical flanged disc, made of sheet-material processed expediently by sheet-deformation, which is subdivided into sections promoting assembly with introductory continuously increasing and thereafter reduced local diameter.

7 Claims, 7 Drawing Sheets

AIR-SPRING, IN PARTICULAR FOR THE USE UNDER EXTREME CONDITIONS

FIELD OF THE INVENTION

The invention relates to an improved air spring, mainly for the use under extreme conditions.

BACKGROUND OF THE INVENTION

Known air springs consist generally of a diaphragm made of rubberized textile material which is capable of deformation, and of a metal armature, a closing element connecting thereto and providing airtight closure. The function of the closing element is to affix the air spring to the suspended body (e.g. a vehicle) and also to assure inlet and outlet of the actuating air. Airtight closure is to be established between the flanges of the diaphragm and the closing element so, as to be able to maintain increased pressure caused by springing in the full length of the spring path, i.e. to achieve airtight closure even upon the effect of tensile forces upon the extreme release of springs.

Several solutions have been proposed for the structure of the system consisting of the closing element and the diaphragm. FIGS. 1-5 show various air spring structures employed in the prior art.

With one type of known air spring the flanges of the diaphragm are fixed between the two metal parts by the compressive force of screws. Such a solution is shown in FIGS. 1 and 2, wherein compressive force provides a hermetic sealing and keeps the flange of the diaphragm in the proper position.

FIG. 1 shows in a partially sectional view, the clamping flange of the diaphragm on an air spring and the manner of assembly for achieving hermetic sealing.

With the solution known from practical manufacturing throughout the world, the flange of a diaphragm 1 is fitted into an appropriately shaped part of a closing element 2. This operation is rather difficult due to a vulcanized marginal wire 5. Then a fixing lid 3 if fitted onto usually at least eight circumferential screws contained in the closing element 2. The closing lid also contains the connection for air, and it is fixed to the closing element 2 by nuts 4. The structure is sealed after having tightened the nuts with the proper torque.

FIG. 2 is a partial sectional view of a well known solution. Here the hermetic closure is also obtained by means of screws. In comparison to the structure of FIG. 1 the essential difference is that the diaphragm flange 6 is turned by 180° in relation to the flange of the diaphragm 1. Considering that the flange 6 is fitted to a closing element 7 along a shorter periphery than the diaphragm 1 of FIG. 1, there are usually fewer, such as from 1 to 4 fixing screws 8 of the closing element 7, and the tolerances of the production are not so tight. Arrangement of the fixing lid 9 and air-connection 10 corresponds to the similar element in FIG. 1. The drawback of clamping — as to be seen in FIGS. 1 and 2— is the high cost and the complicated nature of the mounting.

FIG. 3 shows in partial section the flange part of a conventional air spring. In this case formation of the rolling diaphragm 11 corresponds to that of FIG. 1, except that here the lid is not installed by screws, but it is a compressed, flanged lid 12. That means that the diaphragm cannot be disassembled when it becomes damaged, and the lid 12 must be discarded together with the air connection 13 thereon and all the other fittings and connections.

FIG. 4 illustrates in partial cross section a formation of the customary flange, showing the entire air spring and the hermetic flange mounting. The flange of the diaphragm 14 is pulled onto the profiled ring 16 which is welded onto the fixing lid 15. In this case airtight sealing is obtained by dimensional overlapping, while resistance to downwards motion of the flange of the diaphragm can be achieved only by the adhesion of the overlapping, close fitting of the conical surfaces. This solution can be easily assembled, however, in an extreme springing position the diaphragm may slide down easily from the profiled ring 16.

FIG. 5 is a partial cross-sectional view of a known air spring, illustrating a frequently used method for fitting the flanges and metal parts. In this case, as mentioned in connection with FIG. 4, an air-tight closure is obtained on the conical surfaces of the metal and the flange of the diaphragm, establishing a proper overlap. The extent of overlap and the cone angle influence the quality of the assembly, airtightness and pulling force, i.e. the force, which is needed for removing the diaphragm from the metal part. To obtain proper overlap and fit, most accurate assembly is necessary. However, problems may arise even with the highest accuracy, in connection with the resistance to pulling forces. These are structures in which a nose-part is formed on the conical surface to provide resistance to sliding down, are aimed at the solution of that problem.

It is clear from FIG. 5 that the locking ring 17 is provided with the nose-part 17a backsliding of the diaphragm 18. Accordingly, sliding up of the flanges of the diaphragm 18 requires a far higher inner overpressure, than e.g. positioning of a marginal ring. Prevention of backsliding of the diaphragm 18 is of utmost importance also with diaphragms operated at low pressure. The advantage of the nose-part 17a lies in that is prevents backsliding of the diaphragm in air springs operated in extreme positions, such as in the case of complete release of the spring.

It is a disadvantage that the nose-part 17a requires most accurate assembly, because it can be formed only with expensive cutting. Also mounting requires special tools and high internal pressure.

The mode of fixation i.e. combined application of flange-formation and of the ring with the nose-like cross-section, represents the prior art, as it is described DE-AS 3,246,599.

Further modes of fixation result in unreleasable bonds between diaphragm, closing element and sometimes the piston (see e.g. German Federal Republic allowed application No. 3,246,962). Therefore, when the rubber becomes damaged, the entire structure has to be thrown away and this is both uneconomical and inimical to the environment.

BRIEF DESCRIPTION OF THE INVENTION

The object of the invention is to eliminate deficiencies of known solutions, that means to provide an exchangeable diaphragm for the air spring, to prevent backsliding in the course of use and to achieve proper airtight construction. A further object is to lower production costs of the metal part and to enable simple assembly.

The essence of the invention is a flanged disc construction of an air spring which enables better utilization of the capabilities available from the elasticity of the flange of the diaphragm for achieving proper airtightness.

An essential feature of the invention is that by using a flanged disc and a diaphragm with a suitably shaped flange, with a reentrant position, and a matingly shaped diaphragm edge, savings in production costs and far improved airtightness can be achieved in comparison to usual air springs, and assembly can be carried out much more simply and repairs can be effected more economically.

When installing the flange of the air spring according to the invention the flange is divided into functional A–C zones as shown in FIG. 6.

Zone A is the area within which sealing is achieved by considerable deformation of the edge of the elastic membrane;

Zone B is a surface supported by marginal steel sire inserts and, therefore, stable fitting and tightness of the edge of the diaphragm against the flanged disc is assured; and Zone C is a decompressive surface, fitting to the metal surface of the section of the flange-ring which is pressed through the maximal diameter of the metal part, having a reducing diameter; its resistance to backsliding is proportional to the intensity of effort involved in repeated compression.

The air spring of the present invention comprises an impact surface, a substantially rigid flanged disk attached in a plane to and disposed partially parallel to said surface, said flange disk having an edge which ranges from a first point at which the flanged disk is no longer disposed parallel to said surface said first point being disposed within Zone B, in a direction outwardly from said first point to a second point in Zone B, that is disposed on a line that is perpendicular relative to said plane, said flanged disk having a reentrant portion from said second point inwardly to a third point beyond Zone C, that is spaced from said surface and that represents the edge of said flanged disk, and a deformable diaphragm adapted to be maintained at an edge thereof in a substantially fluid-tight mating relationship to said flanged disk before and after said first point.

BRIEF DESCRIPTION OF THE DRAWING

The air spring according to the present invention is described with reference to the accompanying drawings in which.

DESCRIPTION OF PREFERRED EMBODIMENT

Figure 1:
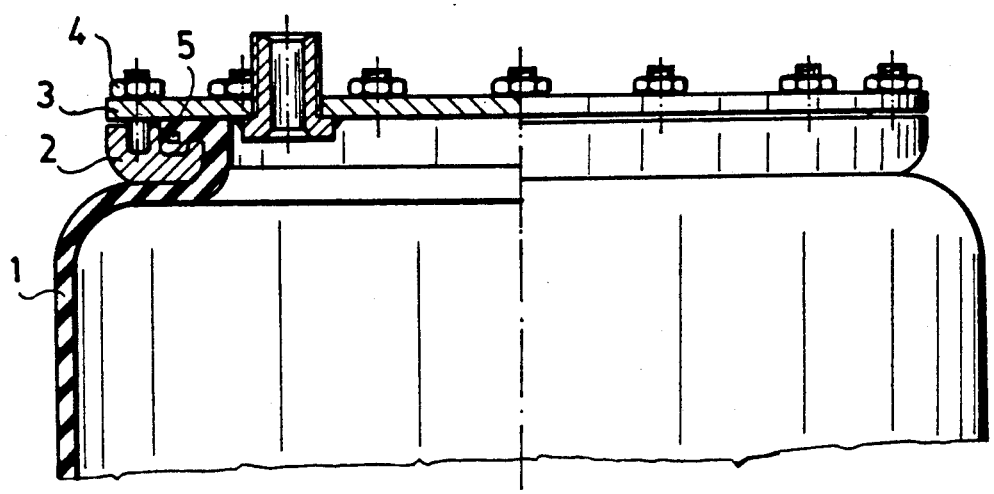
FIGS. 1–5 show air spring structures from the prior art.
Figure 2:
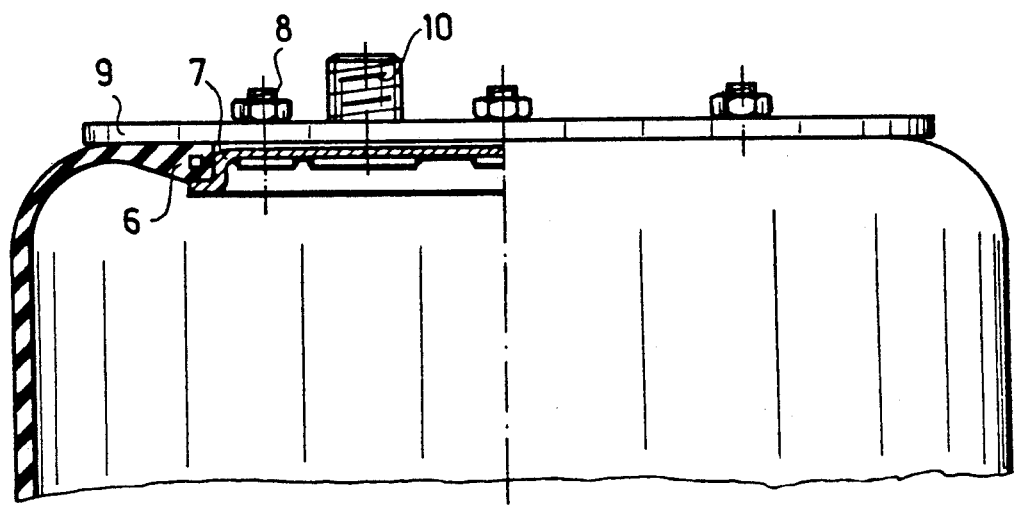
Figure 3:
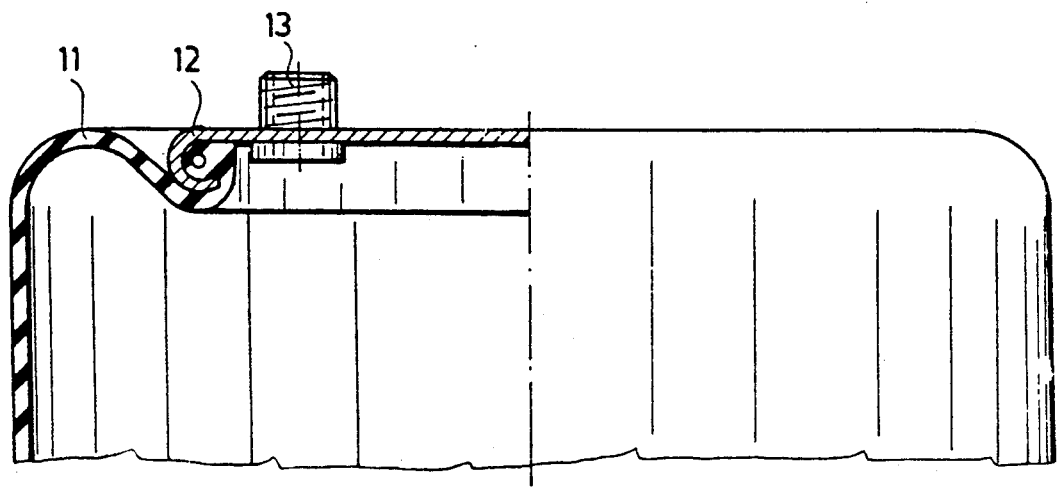
Figure 4:
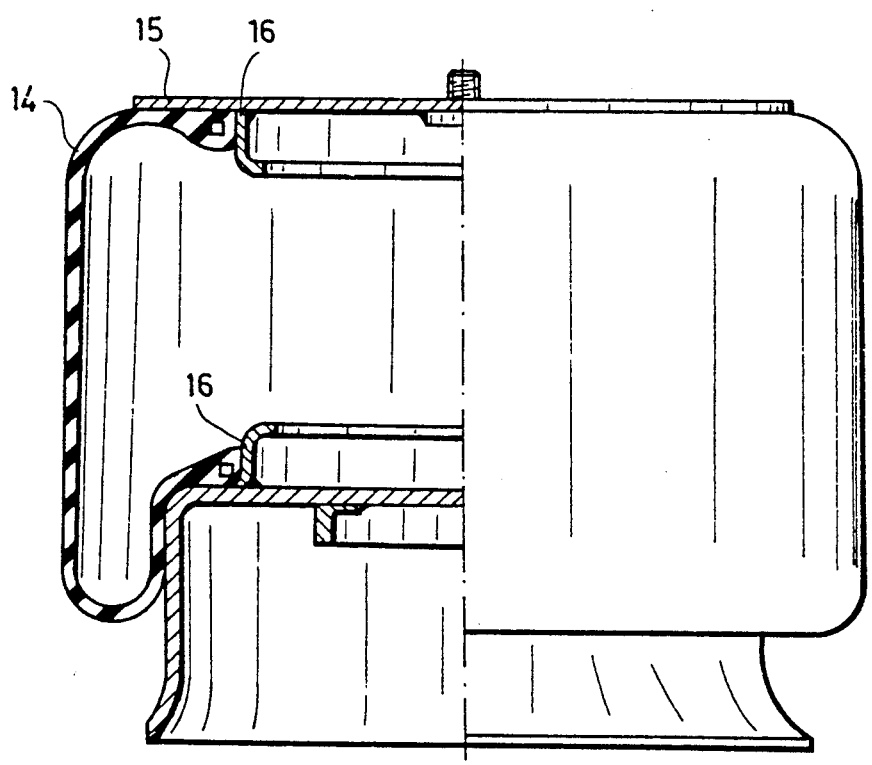
Figure 5:
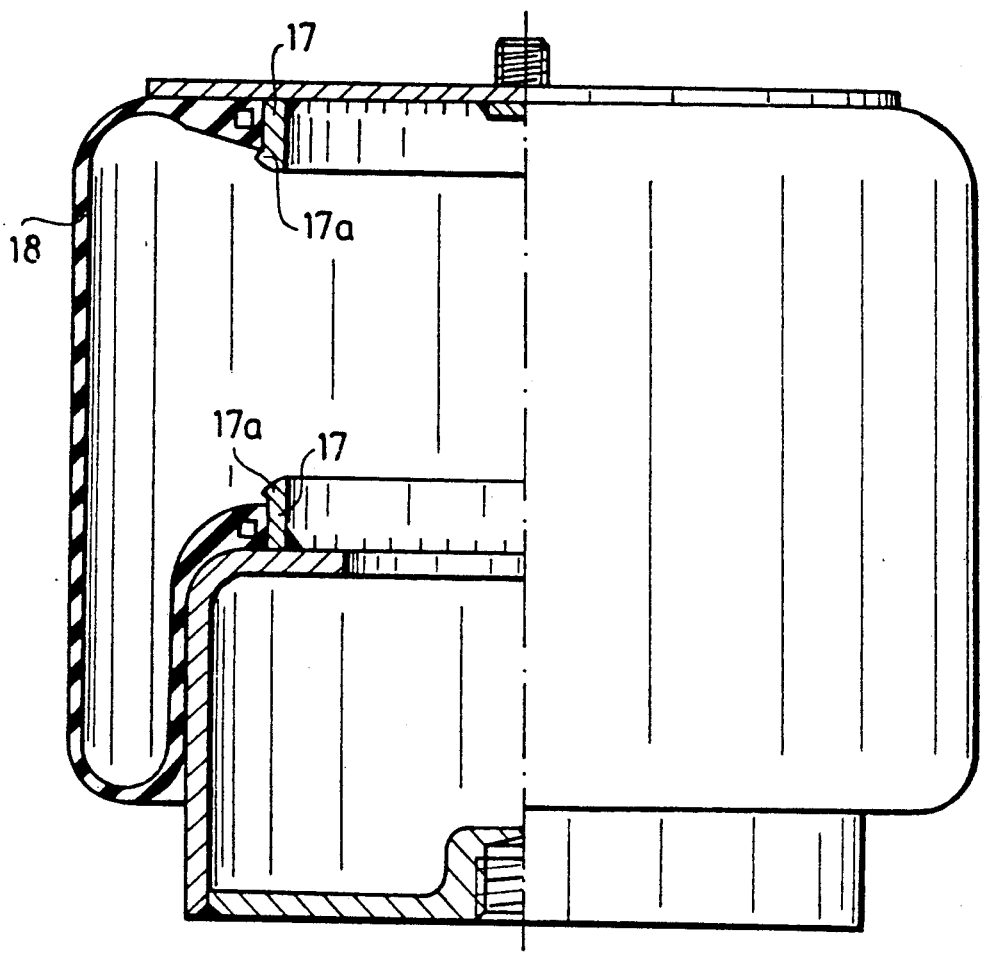
Figure 6:
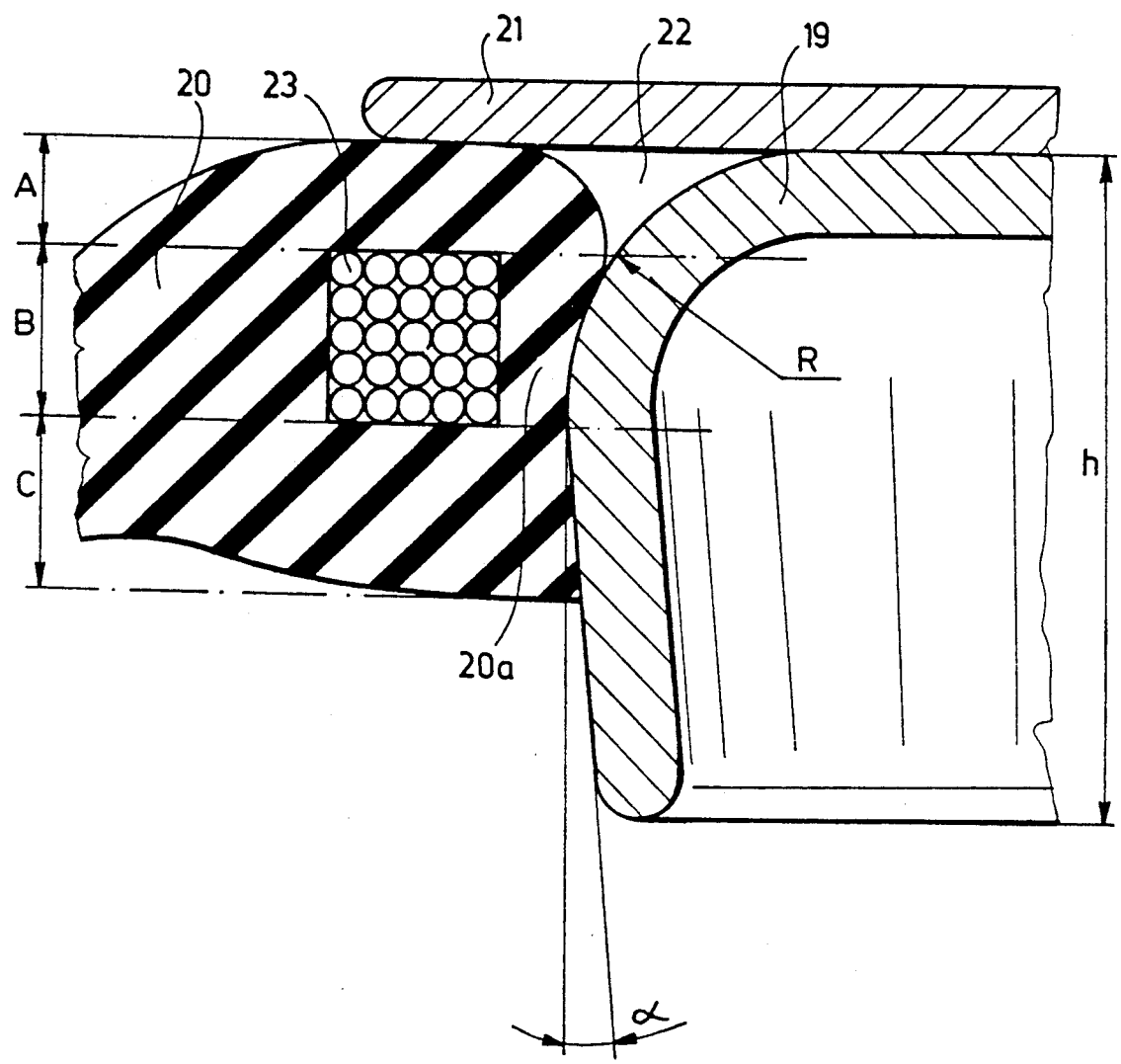
FIG. 6 is a fragmentary sectional view of an advantageous embodiment of the invention.

As shown in FIG. 6, a flanged disc 19 and an impact-surface 21 are interconnected by welding or gluing. The flanged disc represents an important part of the metal fittings. These can be easily formed such as be deep drawing. An elastic diaphragm 20 is installed onto the conical surface of the flanged disc 19 by inner air-pressure, upon the effect of which the rubber rim of a flange 20a of the diaphragm 20 becomes deformed. A part of the flange 20a of the diaphragm 20 slides above the maximal diameter of the flanged disc 19 and snaps into an empty space-part 22 formed by the part with reducing diameter defined by the radius R of curvature, as shown in FIG. 6. A rigid reinforcement 23 is also provided in the rubber rim 20a. In the course of assembling the diaphragm, final positioning of the flange 20a takes places suddenly and it is usually accompanied by a popping sound.

Following the snapping, the space between the flange 20a of the diaphragm 20 and the flanged disc 19 can be filled with a raw rubber or other adhesive mixture, vulcanized to the surface of the diaphragm 20 and the metal strength of the bond can be further increased. When repair is desired, the worn out diaphragm 20 can be cut, the filling material can be easily removed and the flanged disc 19 can be reused.

The flange 20a with the flanged disc 19 contained therein assure airtight closure and collectively form a part of the complete air spring. The flanged disc 10 can be mounted onto the other metal parts be means of a screw connection, or by welding; it can also be glued, or any other mode of connection can be employed.

Figure 7:
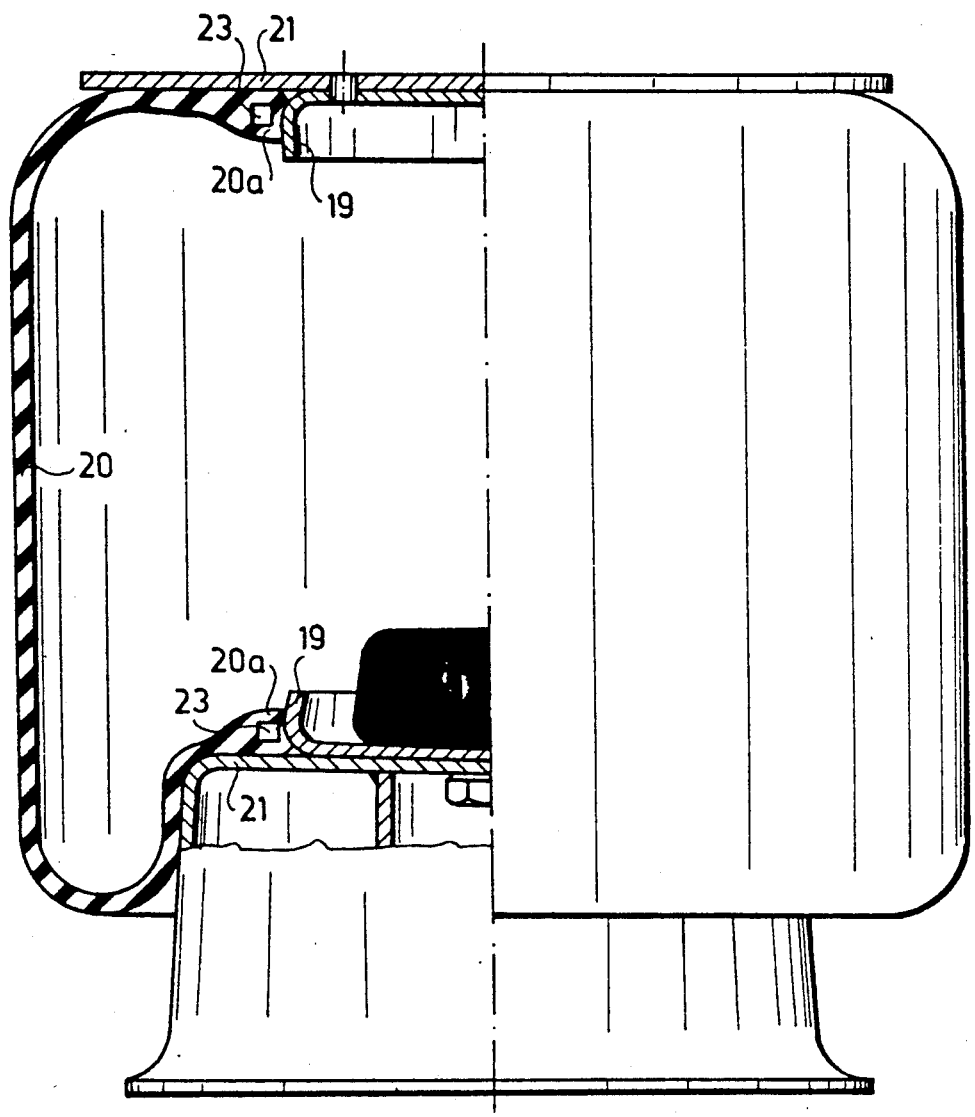
FIG. 7 is a semi-sectional view of a second embodiment of the invention.
Figure 8:
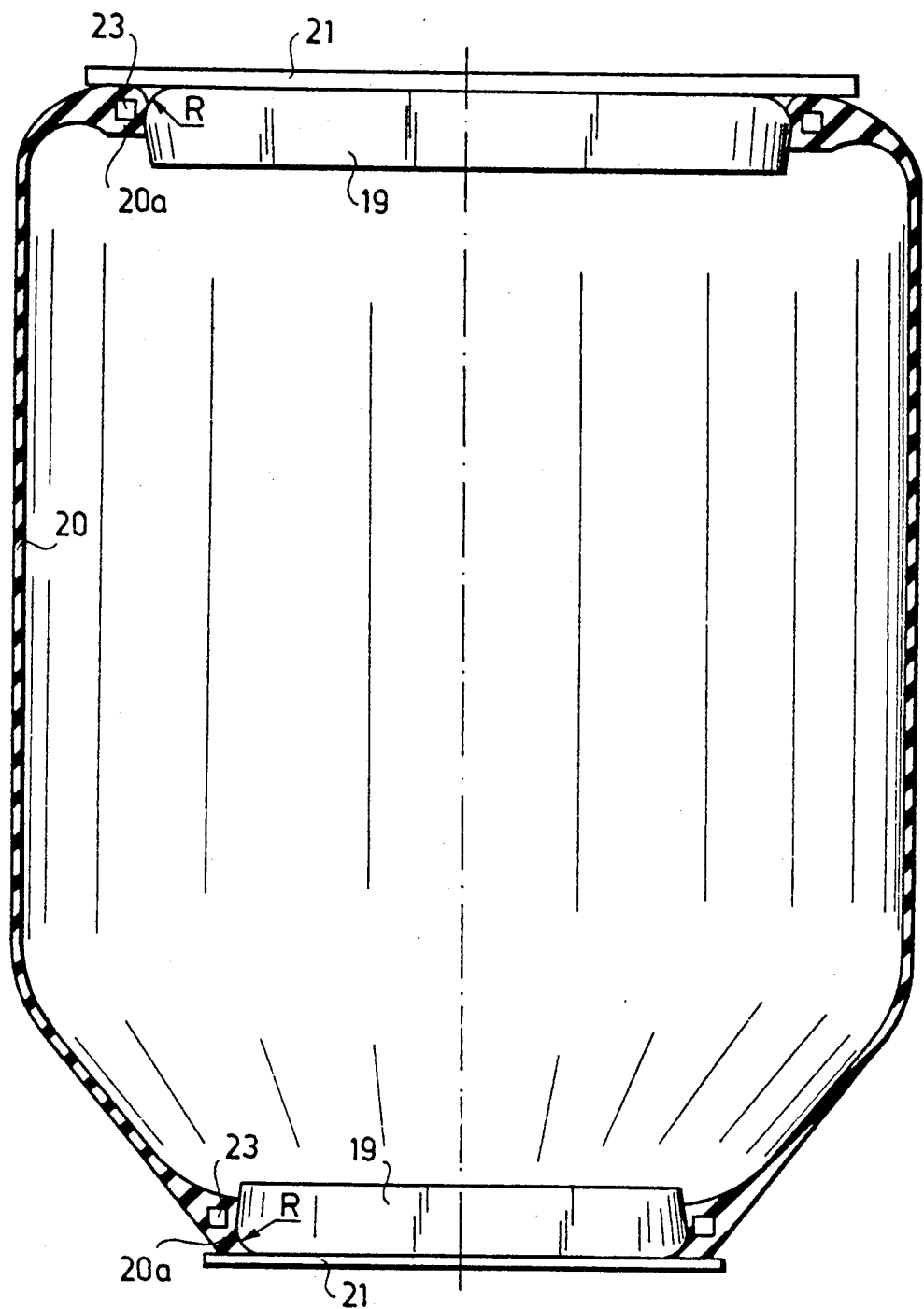
FIG. 8 is a sectional view of a third embodiment of the invention.

FIGS. 7 and 8 illustrate the flanges 20a fixed to the disc-plate 19. Both ends of the rolling diaphragm are provided with flanged discs 19 which can be equally dimensioned at both ends of the diaphragm (FIG. 7), or their diameter can be different (FIG. 8). The flanged discs 19 are connected releasably to the fabric insert of the flanges 20a of the diaphragm 20 and the rubber, respectively, so that undesired stresses will not occur in the rubber containing the fabric-insert. The flanges 20a of the diaphragms enable reliable functioning even in a stressed condition.

The rolling diaphragm 20 of FIG. 7 is made of a rubber mixture reinforced with fabric; it may have a conical or cylindrical shape. The diaphragm 20 is provided with edge flanges 20a having equal or different diameters of each edge of the diaphragm. The edge flanges 20a are facing the axis of symmetry of the diaphragm 20.

A part of the edge flange 20a of the diaphragm 20 of the air spring is arranged in the reentrant space 22 on the flanged disc, so that additional force is needed for establishing the resistance to pulling down. This force is added to the forces resulting from overlapping and internal pressure.

The entrant cone angle of the flanged disc 19 is to be adjusted so, that the half-aperture angle $\alpha$ thereof as shown in FIG. 6, should be suitably between 3° and 7°, while the height of the flanged disc 19, that means the length "h" of the perpendicular line measured from the impact surface 21 fixed thereto, is 2 to 4 times longer than the radius R of curvature.

Figure 9:
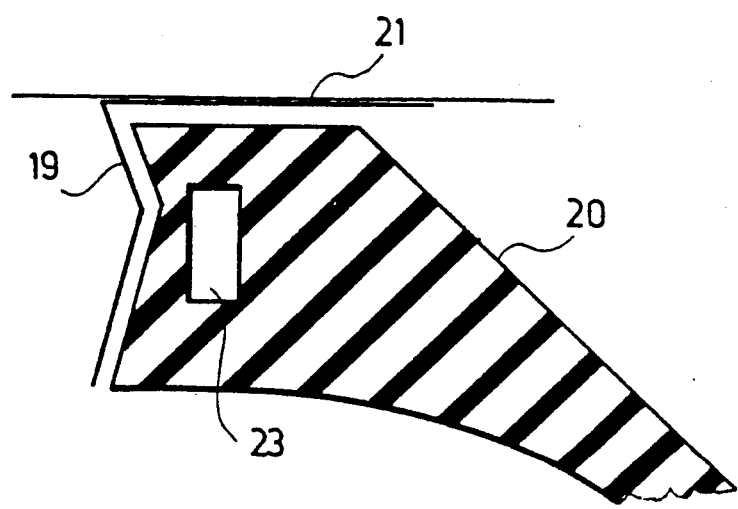
FIG. 9 shows yet another embodiment.

FIG. 9 illustrates an embodiment of the invention in which the mating surfaces of the flange and the edge of the diaphragm, are substantially straight lines.

We claim:

1. An air spring comprising an impact surface, a substantially rigid flanged disk attached at its exterior surface in a plane to and disposed partially parallel to said impact surface, said flange disk having an edge which ranges from a first point on said exterior surface at which the flanged disk is no longer disposed parallel to said impact surface, in a direction outwardly from said first point to a second point on said exterior surface, said second point being on a line that is perpendicular relative to said plane, said flanged disk having a re-entrant portion from said second point inwardly to a third point that is spaced from said impact surface and that represents the edge of said flanged disk, and a deformable diaphragm adapted to be maintained at an edge thereof in a substantially fluid-tight, mating relationship to said flanged disk before said second point.

2. The air spring of claim 1, wherein the edge of said flanged disk said after said first point is a substantially straight line until said second point.

3. The air spring of claim 1, wherein the edge of said flanged disk after said first point curves away from said surface toward the exterior of said spring until said second point, and a space is provided between said surface and said curving of said flanged disk.

4. The air spring of claim 3, wherein said curve is a circular arch.

5. The air spring of claim 3, wherein said space is filled with a raw rubber, or other elastic adhesive.

6. The air spring of claim 1, wherein an angle of about 3° to about 7° is formed between a line tangential to said reentrant portion after said second point and said perpendicular line.

7. The air spring of claim 4, wherein the length of said perpendicular line from said plane of attachment to the plane of said third point is from about 2 to about 4 times longer than the radius of said circular arch.

* * * * *